(12) United States Patent
Lee et al.

(10) Patent No.: US 12,181,674 B2
(45) Date of Patent: Dec. 31, 2024

(54) FOVEATED DISPLAY APPARATUS

(71) Applicant: SAMSUNG ELECTRONICS CO., LTD., Suwon-si (KR)

(72) Inventors: Changkun Lee, Seoul (KR); Seokil Moon, Suwon-si (KR); Geeyoung Sung, Daegu (KR); Hongseok Lee, Seoul (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 17/526,764

(22) Filed: Nov. 15, 2021

(65) Prior Publication Data
US 2022/0179214 A1    Jun. 9, 2022

(30) Foreign Application Priority Data

Dec. 8, 2020 (KR) ........................ 10-2020-0170745

(51) Int. Cl.
G02B 27/10 (2006.01)
F21V 8/00 (2006.01)
G02B 27/00 (2006.01)
G02B 27/01 (2006.01)

(52) U.S. Cl.
CPC ....... G02B 27/0172 (2013.01); G02B 6/0023 (2013.01); G02B 27/0093 (2013.01); G02B 27/0103 (2013.01); G02B 2027/0178 (2013.01)

(58) Field of Classification Search
CPC .............. G02B 27/0172; G02B 6/0023; G02B 27/0093; G02B 27/0103; G02B 5/32; G02B 6/0033

USPC ............................................ 359/15, 32, 630
See application file for complete search history.

(56) References Cited

U.S. PATENT DOCUMENTS

| | | | |
|---|---|---|---|
| 9,710,887 B1 | 7/2017 | Sahlsten et al. | |
| 9,711,072 B1* | 7/2017 | Konttori | ................. G06F 3/013 |
| 9,711,114 B1 | 7/2017 | Konttori et al. | |
| 9,905,143 B1 | 2/2018 | Konttori et al. | |
| 9,983,413 B1 | 5/2018 | Sahlsten et al. | |
| 9,989,774 B1 | 6/2018 | Sahlsten et al. | |
| 10,082,672 B2 | 9/2018 | Rainisto | |
| 10,627,565 B1* | 4/2020 | Trail | ................... G02B 27/0172 |
| 11,402,647 B2* | 8/2022 | Gollier | ............... G02B 27/1026 |

(Continued)

FOREIGN PATENT DOCUMENTS

KR    10-2021-0107408 A    9/2021

OTHER PUBLICATIONS

Communication dated May 19, 2022 issued by the European Patent Office in European Application No. 21210533.2.

(Continued)

*Primary Examiner* — Audrey Y Chang
(74) *Attorney, Agent, or Firm* — Sughrue Mion, PLLC

(57) ABSTRACT

A foveated display apparatus includes a first display panel configured to form a two-dimensional (2D) image; a second display panel configured to form a hologram image comprising a three-dimensional (3D) image; a light guide plate configured to transmit the 2D image at a first angle of view to an eye of a user; and a holographic optical element configured to transmit the hologram image at a second angle of view to the eye of the user, the second angle of view being smaller than the first angle of view.

19 Claims, 17 Drawing Sheets

(56) References Cited

U.S. PATENT DOCUMENTS

| | | | |
|---|---|---|---|
| 2008/0198431 A1* | 8/2008 | Schwerdtner | G03H 1/2294 |
| | | | 359/32 |
| 2014/0146394 A1 | 5/2014 | Tout et al. | |
| 2019/0049899 A1 | 2/2019 | Gelman et al. | |
| 2019/0285897 A1 | 9/2019 | Topliss et al. | |
| 2020/0201038 A1 | 6/2020 | Gelman et al. | |
| 2020/0348518 A1* | 11/2020 | Georgiou | G02B 17/0856 |
| 2021/0208397 A1* | 7/2021 | Lu | G02B 27/0179 |
| 2021/0263318 A1 | 8/2021 | Lee et al. | |

OTHER PUBLICATIONS

Edward Tang, "Foveation is Coming (Conference Presentation)," Proceedings vol. 11310, Optical Architectures for Displays and Sensing in Augmented, Virtual, and Mixed Reality, San Francisco, California, Apr. 2, 2020, (2 total pages).

Kim et al., "Foveated AR: Dynamically-Foveated Augmented Reality Display," ACM Trans. Graph., vol. 38, No. 4, Article 99, Jul. 2019, (15 total pages).

Zhan et al., "Augmented Reality and Virtual Reality Displays: Perspectives and Challenges," CellPress Open Access, iScience 23, 101397, Aug. 21, 2020 (13 total pages).

Yoo et al., "Foveated display system based on a doublet geometric phase lens," Optics Express, vol. 28, No. 16, Aug. 2020, pp. 23690-23702, (13 total pages).

\* cited by examiner

FOVEATED DISPLAY APPARATUS

CROSS-REFERENCE TO RELATED APPLICATION

This application is based on and claims priority under 35 U.S.C. § 119 to Korean Patent Application No. 10-2020-0170745, filed on Dec. 8, 2020, in the Korean Intellectual Property Office, the disclosure of which is incorporated by reference herein in its entirety.

BACKGROUND

1. Field

Example embodiments of the present disclosure relate to foveated display apparatuses capable of providing high resolution images with a narrow viewing angle and low resolution images with a wide viewing angle.

2. Description of Related Art

Virtual reality (VR) is a technology that enables a person to experience life in a computer-generated virtual world. Augmented reality (AR) is a technology that allows virtual images to be mixed with physical environments or spaces in the real world. Near-eye displays in which VR displays or AR displays are implemented focus a virtual image using a combination of optical and stereoscopic images. In such displays, display resolution and processing are important.

Images displayed to a user through a near-eye display apparatus may include a virtual image including highly detailed graphics or a real image. When the near-eye display apparatus processes an image using a software method, image processing may be slow due to a large amount of image processing calculation. To reduce the calculation amount, a foveated display has been developed to provide a high resolution image to a fovea area in the center of a person's view and a low resolution image to the remaining peripheral area.

SUMMARY

Provided are foveated display apparatuses.

Additional aspects will be set forth in part in the description which follows and, in part, will be apparent from the description, or may be learned by practice of the presented embodiments of the disclosure.

In accordance with an aspect of the disclosure, a foveated display apparatus includes a first display panel configured to form a two-dimensional (2D) image; a second display panel configured to form a hologram image comprising a three-dimensional (3D) image; a light guide plate configured to transmit the 2D image at a first angle of view to an eye of a user; and a holographic optical element configured to transmit the hologram image at a second angle of view to the eye of the user, the second angle of view being smaller than the first angle of view.

The 2D image may include a peripheral image having a first resolution, the hologram image may include a fovea image having a second resolution that is higher than the first resolution.

The 2D image may include a single depth image, and the hologram image may include a multi depth image.

The second angle of view may include about 20 degrees or less.

The light guide plate may include a first surface from which light is emitted; a second surface facing the first surface; and an input coupler on one side of the first surface or the second surface.

The light guide plate may include a first surface from which light is emitted; a second surface facing the first surface; and an output coupler on one side of the first surface or the second surface.

The light guide plate may include a first surface through which light is emitted and a second surface facing the first surface, and the holographic optical element may be provided on the first surface or the second surface.

The second display panel may include a light-emitting diode (LED) display, an organic LED (OLED) display, a liquid crystal display (LCD) display, or a liquid crystal on silicon (LCoS) display.

The foveated display apparatus may further include a light source configured to radiate light to the second display panel; a beam splitter configured to reflect the light radiated from the light source to be incident on the second display panel and transmit the light reflected from the second display panel; and a filter configured to filter the light passing through the beam splitter.

The foveated display apparatus may further include a light path converter configured to direct the light that has passed through the filter to the holographic optical element.

The foveated display apparatus may further include a light source configured to radiate light to the second display panel; and a filter configured to filter the light emitted from the light source that has passed through the second display panel.

The light guide plate may include a first surface; a second surface facing the first surface; and a sub light guide plate on the first surface, wherein the first display panel faces the second surface, and wherein the hologram image formed on the second display panel is transmitted through the sub light guide plate.

The sub light guide plate may include an inclined incidence surface on one side thereof, and the hologram image formed on the second display panel may be incident on the inclined incidence surface.

The holographic optical element may be provided between the light guide plate and the sub light guide plate or may be provided on an exit surface of the sub light guide plate.

The first display panel and the second display panel may be integrally configured, and the foveated display apparatus may further include a light source configured to radiate light to the first display panel and the second display panel; a first beam splitter between the first display panel and the light source; and a second beam splitter between the second display panel and the light source.

A 2D image reflected from the first beam splitter may be incident on the light guide plate, and the hologram image reflected from the second beam splitter may be incident on the holographic optical element.

The 2D image may be transmitted through the light guide plate, and the hologram image may be transmitted to the holographic optical element without passing through the light guide plate.

The 2D image and the hologram image may be combined to display a single image.

The foveated display apparatus may further include at least one of a micro electro-mechanical system (MEMS) mirror, a galvano mirror, a liquid crystal lens, a liquid crystal beam deflector, a geometric phase lens, and a meta lens for controlling an area on which the hologram image is displayed.

The foveated display apparatus may further include a pupil tracker configured to track a user's pupil.

In accordance with an aspect of the disclosure, a foveated display apparatus includes a first optical system that provides a two-dimensional (2D) image to a user's eye via a first optical path; and a second optical system that provides a three-dimensional hologram image to the user's eye via a second optical path different from the first optical path.

The first optical system may provide the 2D image to a peripheral region of a field of view of the user's eye, and the second optical system may provide the hologram image to a fovea region of the field of view of the user's eye.

The first optical system may include a first display panel configured to form the 2D image; and a light guide plate configured to transmit the 2D image to the user's eye.

The second optical system may include a second display panel configured to form the hologram image; and a holographic optical element configured to transmit the hologram image to the user's eye.

The holographic optical element may be positioned on a surface of the light guide plate.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
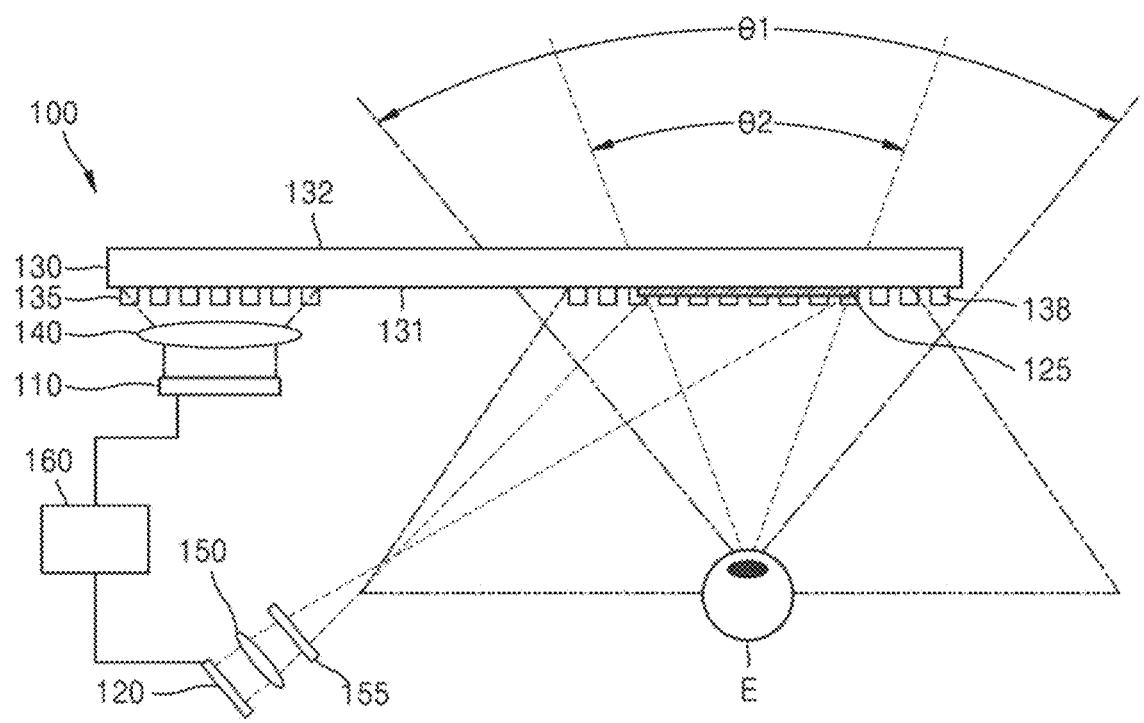
FIG. 1 schematically illustrates a foveated display apparatus according to an example embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

A foveated display apparatus according to various example embodiments are described in detail with reference to the accompanying drawings. In the accompanying drawings, wherein like reference numerals refer to like elements throughout. Also, the size of each layer illustrated in the drawings may be exaggerated for convenience of explanation and clarity. Terms such as "first" and "second" are used herein merely to describe a variety of constituent elements, but the constituent elements are not limited by the terms. Such terms are used only for the purpose of distinguishing one constituent element from another constituent element.

An expression used in a singular form in the present specification also includes the expression in its plural form unless clearly specified otherwise in context. Throughout the specification, when a portion "includes" an element, another element may be further included, rather than excluding the existence of the other element, unless otherwise described. Also, the size or the thickness of each layer illustrated in the drawings may be exaggerated for clarity of explanation. Also, in the following description, when a material layer is described to exist on another layer, the material layer may exist directly on the other layer or a third layer may be interposed therebetween. Because a material forming each layer in the following embodiments is an example, other materials may be used therefor.

Terms such as a "portion", a "unit", a "module", and a "block" stated in the specification may signify a unit to process at least one function or operation and the unit may be embodied by hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of terms "a" and "an" and "the" and similar referents in the context of describing the disclosure (especially in the context of the following claims) are to be construed to cover both the singular and the plural.

The steps of all methods described herein may be performed in any suitable order unless otherwise indicated herein or otherwise clearly contradicted by context. The use of any and all examples, or language (e.g., "such as") provided herein, is intended merely to better illuminate the disclosure and does not pose a limitation on the scope of the disclosure unless otherwise claimed.

FIG. 1 illustrates a foveated display apparatus 100 according to an example embodiment.

The foveated display apparatus 100 may include a first display panel 110 forming a two-dimensional (2D) image, a second display panel 120 forming a hologram image including a three-dimensional (3D) image, a light guide plate 130 transmitting the 2D image, and a holographic optical element 125 transmitting the hologram image. For example, the first display panel 110 may be included in a first optical system providing the 2D image via a first optical path and the second display panel 120 may be included in a second optical system providing the hologram image via second optical path different from the first optical path.

The 2D image may include, for example, an image having a single depth, and the hologram image may include an image having multiple depths. Accordingly, the hologram image may display the 3D image. The first display panel 110 and the second display panel 120 may be provided to be spaced apart. The first display panel 110 may include, for example, an liquid crystal display (LCD), a liquid crystal on silicon (LCoS), an organic light-emitting diode (OLED) display, or an light-emitting diode (LED) display. The first display panel 110 may process an image signal to form the 2D image. The second display panel 120 may include, for example, an LCD, an LCoS, an OLED display, or an LED display. The second display panel 120 may process an image signal to form the 3D image. The second display panel 120 may process a computer generated holography (CGH) image signal to form the hologram image, and may process a relatively large amount of image signals and calculations compared to the 2D image.

The 2D image output from the first display panel 110 may be incident on the light guide plate 130 and may be transmitted to a user's eye E through the light guide plate 130. In the disclosure, an image is assumed to include the concept of an image light that displays a corresponding image. The 2D image may be transmitted with a first angle of view $\theta 1$ to the user's eye E. That is, the 2D image may be transmitted to have a first field of view corresponding to the first angle of view $\theta 1$. The holographic optical element 125 may transmit the hologram image with a second angle of view $\theta 2$ to the user's eye E. That is, the hologram image may be transmitted to have a second field of view corresponding to the second angle of view $\theta 2$. The second angle of view $\theta 2$ may be smaller than the first angle of view $\theta 1$, such that the second field of view is smaller than the first field of view. The second angle of view $\theta 2$ may be, for example, greater than 0 and equal to or less than 20 degrees. When the second angle of view $\theta 2$ is relatively small, and the second display panel 120 has the same or similar number of pixels as the first display panel 110, the hologram image displayed with the second angle of view $\theta 2$ may have a relatively high resolution image compared to that of the 2D image. The hologram image may be displayed on a fovea area (i.e., a fovea region of the field of view of the user's eye), and the 2D image may be displayed on a peripheral area of the fovea area (i.e., a peripheral region of the field of view of the user's eye). Therefore, because the hologram image displayed on the fovea area is provided in high resolution, a user may see an image stereoscopically.

The holographic optical element 125 may react only to incident light having a specific incidence angle and a specific wavelength. In addition, the holographic optical element 125 may output incident light with a narrow angle of view. In addition, the holographic optical element 125 may be configured to record hologram information on, for example, a thin film and is very thin, and thus the holographic optical element 125 may be easily disposed in an optical device and may reduce the size of the entire system. The holographic optical element 125 may be combined in contact with, for example, a first surface 131 of the light guide plate 130 as shown in FIG. 1. That is, the holographic optical element 125 may be integrally attached to the light guide plate 130. However, a position of the holographic optical element 125 is not limited thereto.

An input coupler 135 may be further provided on one side of the light guide plate 130. The input coupler 135 may be provided, for example, on a part of one surface of the light guide plate 130. The light guide plate 130 may include, for example, the first surface 131 through which an image is emitted to the user's eye E, and a second surface 132 facing the first surface 131. The input coupler 135 may be provided on, for example, a part of the first surface 131. Alternatively, the input coupler 135 may be provided on the second surface 132. The input coupler 135 may allow light to be coupled into the light guide plate 130. The input coupler 135 may guide the light to travel through the inside of the light guide plate 130 while the light is totally reflected.

In addition, an output coupler 138 may be provided on a different part of the light guide plate 130. The output coupler 138 may allow light that has traveled through the light guide plate 130 to be output to the outside of the light guide plate 130. The output coupler 138 may be provided on, for example, the first surface 131 and spaced apart from the input coupler 135. However, the position of the output coupler 138 is not limited thereto, and the output coupler 138 may be provided on the second surface 132. The input coupler 135 and the output coupler 138 may include, for example, a diffractive element, and may be provided on the light guide plate 130 with an embossed structure or an engraved structure.

A first lens 140 may be further provided between the first display panel 110 and the input coupler 135. The first lens 140 may magnify the 2D image output from the first display panel 110. A second lens 150 may be further provided between the second display panel 120 and the holographic optical element 125. However, the number or positions of lenses is not limited thereto.

The foveated display apparatus 100 may further include a beam steering element 155 controlling an area on which the hologram image is displayed. The beam steering element 155 may include, for example, at least one of a micro electro-mechanical system (MEMS) mirror, a galvano mirror, a liquid crystal lens, a liquid crystal beam deflector, a geometric phase lens, and a meta lens. The beam steering element 155 may be disposed between the second display panel 120 and the holographic optical element 125.

The foveated display apparatus 100 according to an example embodiment may further include a pupil tracker 160 that tracks a user's pupil. The pupil tracker 160 may be connected to the first display panel 110 and the second display panel 120. Positions of the 2D image formed by the first display panel 110 and the hologram image formed by the second display panel 120 may change according to a change in a position of the pupil tracked by the pupil tracker 160.

Figure 2:
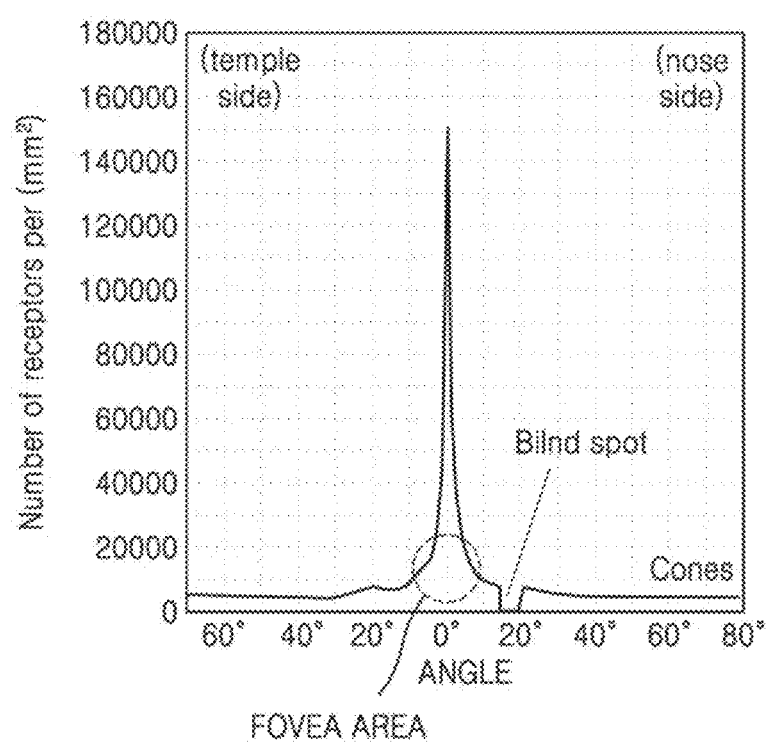
FIG. 2 illustrates a number of receptors according to a viewing angle of a person.

The person's eye has the best resolution in the vicinity of the fovea, where the optic cells are most densely distributed, and the resolution is relatively low in a peripheral area of the fovea (i.e., an area around the fovea). FIG. 2 illustrates a number of receptors according to an angle of view viewed through a person's eye. Referring to FIG. 2, it may be seen that a person uses a fovea area when distinguishing detailed objects through eyes.

Therefore, it is inefficient to increase the resolution with respect to all areas of a person's view. Accordingly, a relatively high resolution image is provided in a foveated region that the person focuses and views sensitively, and a relatively low resolution image is provided in a peripheral region, and thus both a high resolution and a reduction in an image processing computation may be satisfied.

Figure 3:
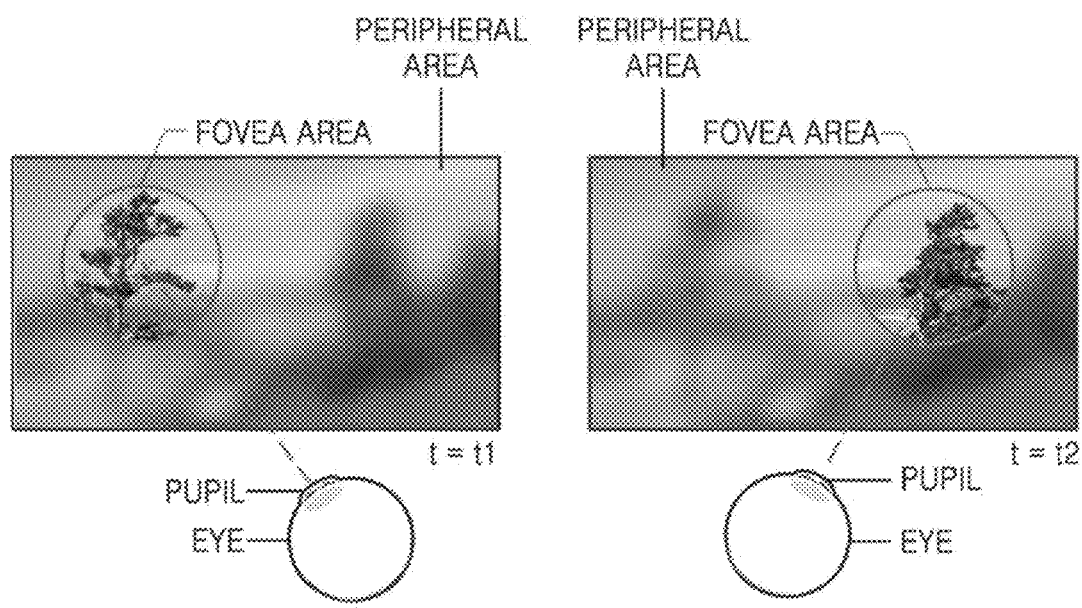
FIG. 3 is a diagram illustrating an operation of a foveated display apparatus.

FIG. 3 illustrates a conceptual operation of the foveated display apparatus 100. The foveated display apparatus 100 may measure a person's gaze using the pupil tracker 160 and provide a high resolution 3D image to a part of a person's pupil.

Referring to FIG. 3, a person's view may include a fovea area corresponding to a human pupil and a peripheral area in the periphery of the fovea area. For example, when time t=t1 and when time t=t2, the fovea area and the peripheral area may be different. In the foveated display apparatus, a relatively high resolution image having a narrow angle of view may be provided to the fovea area and a relatively low resolution image having a wide angle of view may be provided to the peripheral area. The foveated display apparatus 100 may provide a high resolution image as an image of the fovea area and a low resolution image as an image of the peripheral area, thereby reducing a computational amount used for image processing. In addition, in an example embodiment, the foveated display apparatus 100 may provide a hologram image including a high resolution 3D image in the fovea area, thereby increasing a stereoscopic effect.

In most augmented reality (AR) devices using only a holographic optical element, a parallel light or a light emitted from a display hits the holographic optical element and is diffracted, and then converges to a single point. Accordingly, an eyebox, which is an area in which a user of the AR device may observe a virtual image, is limited to one point. In this case, the user may observe the image only when the eye is positioned exactly at a dot where light is collected, and the image is not visible when the eye rotates or an eyeglass device shakes even a little on the face. In addition, when the eyebox is limited to the dot, because a calibration process is performed that adjusts the dot where the image is visible after wearing glasses to fit a gap of a user's eyes, it is difficult for users with various eye gaps to use one eyeglass device. However, the foveated display apparatus 100 according to an example embodiment may solve this problem, and this will be described.

The light guide plate 130 may allow a 2D image formed by the first display panel 110 to be displayed with the relatively wide second angle of view θ2. For example, the second angle of view θ2 may be 60 degrees or more.

Because the light guide plate 130 provides a wide eyebox, the light guide plate 130 may be applied to, for example, a glasses-type AR device. However, in the case of an AR device having only a light guide plate, the light guide plate has a depth of an image generally fixed to infinity, and is difficult to independently control the depth of the image. Accordingly, in order to adjust the depth of the image in the AR device having only the light guide plate, for example, an additional optical element is required to bring a virtual image to a specific depth in front and rear of the light guide plate. When the additional optical element is provided as described above, the overall size may increase due to the additional optical element even though a thickness of the light guide plate is thin. In addition, in the case of the light guide plate method, because the depth is fixed, the user may become dizzy in an AR environment due to a discrepancy between the depth of the image generated by the AR device and the depth of the real-world image.

In consideration of this point, the foveated display apparatus 100 according to an example embodiment may provide a hologram image so that a user may view a 3D image having multiple depths without dizziness. In the case of the hologram image, the depth of the image may be adjusted by software through calculation of a CGH image, and optical distortion may be solved. However, it is difficult to increase the angle of view of the hologram image, and when the angle of view increases, a viewing area may be limited and a depth expression power may decrease as the size of the eyebox decreases. That is, the hologram image has a trade-off relationship between the angle of view and the size of the eyebox.

Therefore, in the foveated display apparatus 100 according to an example embodiment, by using this characteristic of the hologram image, the hologram image is provided to only the fovea area, not the entire field of view, and a 2D image is provided to the remaining peripheral area, and thus the hologram image with a relatively narrow angle of view and the 2D image with a relatively wide angle of view may be combined into a foveated display. The 2D image may be displayed on the peripheral area having the relatively wide angle of view, and the hologram image employing a holographic method may be displayed on the fovea area having the relatively narrow angle of view through the light guide plate 130. For example, the second angle of view θ2 at which the hologram image is displayed may be about 20 degrees or less, and the first angle of view θ1 at which the 2D image is displayed may be 60 degrees or more. Even if the second angle of view θ2 is about 20 degrees or less, it is possible to display the hologram image having the second angle of view θ2 on the fovea area, and because the second angle of view θ2 is relatively small, a high resolution image may be provided. Therefore, the user may view a high resolution image with a sense of depth without an eye strain in the fovea area that a user mainly perceives with the eyes. In addition, because the peripheral area around the fovea area is relatively less sensitive than the fovea area, even if the 2D image with a relatively wide angle of view is displayed on the peripheral area, the user may view the image without recognizing a difference in the resolution. As described above, an image with the difference in the resolution between the fovea area and the peripheral area is displayed, thereby providing a 3D image with a sense of depth while reducing the computational amount of the hologram image. In addition, instead of narrowing the angle of view of the hologram image, the eyebox may increase. Therefore, it is possible to cover different distances between the user's two eyes using a wide eyebox.

In addition, because the light guide plate 130 provides a fixed focus while the holographic optical element 138 provides various focus information through a CGH computation, it is possible to correct the image in advance in an appropriate shape according to an eye condition of a person with eye disease.

Figure 4:
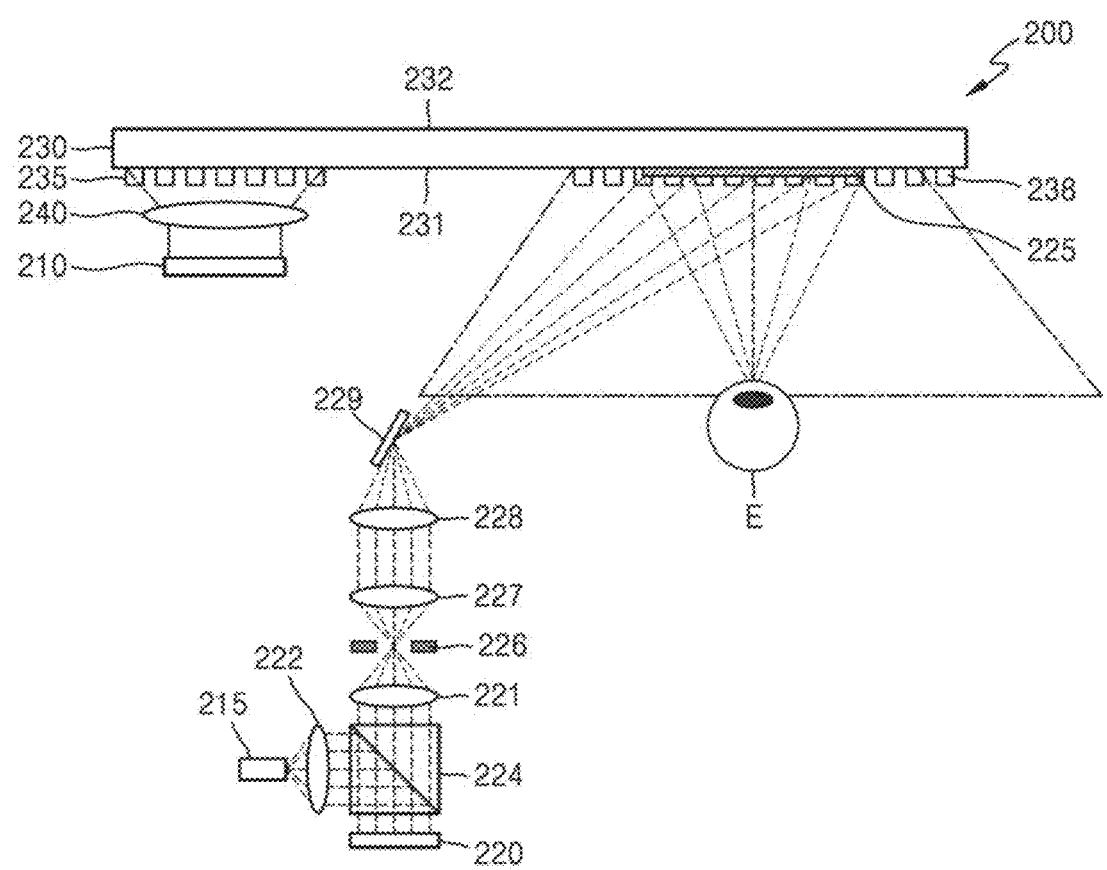
FIG. 4 illustrates a foveated display apparatus according to an example embodiment.

FIG. 4 illustrates a foveated display apparatus 200 according to an example embodiment.

The foveated display apparatus 200 may include a first display panel 210 forming a 2D image, a second display panel 220 forming a hologram image having a 3D image, a light guide plate 230 transmitting a 2D image, and a holographic optical element 225 transmitting a hologram image.

The 2D image may be displayed on a peripheral area of a fovea area, and transmitted through the light guide plate 230 so that the 2D image may enter the user's eyes with a relatively wide first angle of view. The hologram image may be displayed on the fovea area and may enter the user's eyes with a relatively narrow second angle of view through the holographic optical element 225.

A first lens 240 may be further provided between the first display panel 210 and the light guide plate 230. The first lens 240 may include, for example, a Fourier transformation lens. The Fourier transformation lens may transform spatial information of the 2D image formed on the first display panel 210 into an angular component, thereby causing image information to be incident into the light guide plate 230. An input coupler 235 may be further provided between the first display panel 210 and the light guide plate 230. The input coupler 235 may couple the 2D image to the light guide plate 230. The light guide plate 230 may include a first surface 231 through which an image is emitted to the user's eye E, and a second surface 232 facing the first surface 231. The input coupler 235 may be provided, for example, on the first surface 231.

An output coupler 238 may be further provided on another part of the light guide plate 230. The output coupler 238 may be provided on the first surface 231 to be spaced apart from the input coupler 235. The output coupler 238 may guide 2D image information propagated through the light guide plate 230 to be emitted toward the user's eye E.

The holographic optical element 225 may be provided on one side of the light guide plate 230. The hologram image formed on the second display panel 220 may be incident on the holographic optical element 225 and reproduced with a narrow angle of view by the holographic optical element 225 to enter the fovea area of the user's eye E.

A hologram image reproduction optical system may include a light source 215 and a beam splitter 224 reflecting light emitted from the light source 215 to the second display panel 220. In addition, the hologram image output from the second display panel 220 may be transmitted through the beam splitter 224. Here, the second display panel 220 may be a reflective panel. For example, the second display panel 220 may include an LED display, an OLED display, or an LCoS.

A lens and a filter 226 may be further provided on a light path between the beam splitter 224 and the holographic optical element 225. The filter 226 may be a spatial filter for reproducing a CGH.

For example, a second lens 221 may be provided between the beam splitter 224 and the filter 226, and a third lens 227 and a fourth lens 228 may be provided between the filter 226 and the holographic optical element 225. However, the number and positions of lenses are not limited thereto.

A light path converter 229 may be further provided between the filter 226 and the holographic optical element 225. The light path converter 229 may be a mirror for converting a path of light. The light path converter 229 may be employed for spatial utilization between the second display panel 220 and the holographic optical element 225. The holographic optical element 225 may be directly coupled to one surface of the light guide plate 230. The holographic optical element 225 may be provided to overlap with, for example, the output coupler 238. The holographic optical element 225 may be provided in the center of the output coupler 238. The holographic optical element 225 may be provided, for example, on a part of a light incident surface on which light is incident on the light guide plate 230.

In FIG. 4, the first display panel 210 and the second display panel 220 may be provided in the same direction with respect to the light guide plate 230. In other words, the first display panel 210 and the second display panel 220 may both be positioned on the same side of the light guide plate 230. However, the positions of the first display panel 210 and the second display panel 220 are not limited thereto, and the first display panel 210 and the second display panel 220 may be provided in opposite directions with respect to the light guide plate 230.

Figure 5:
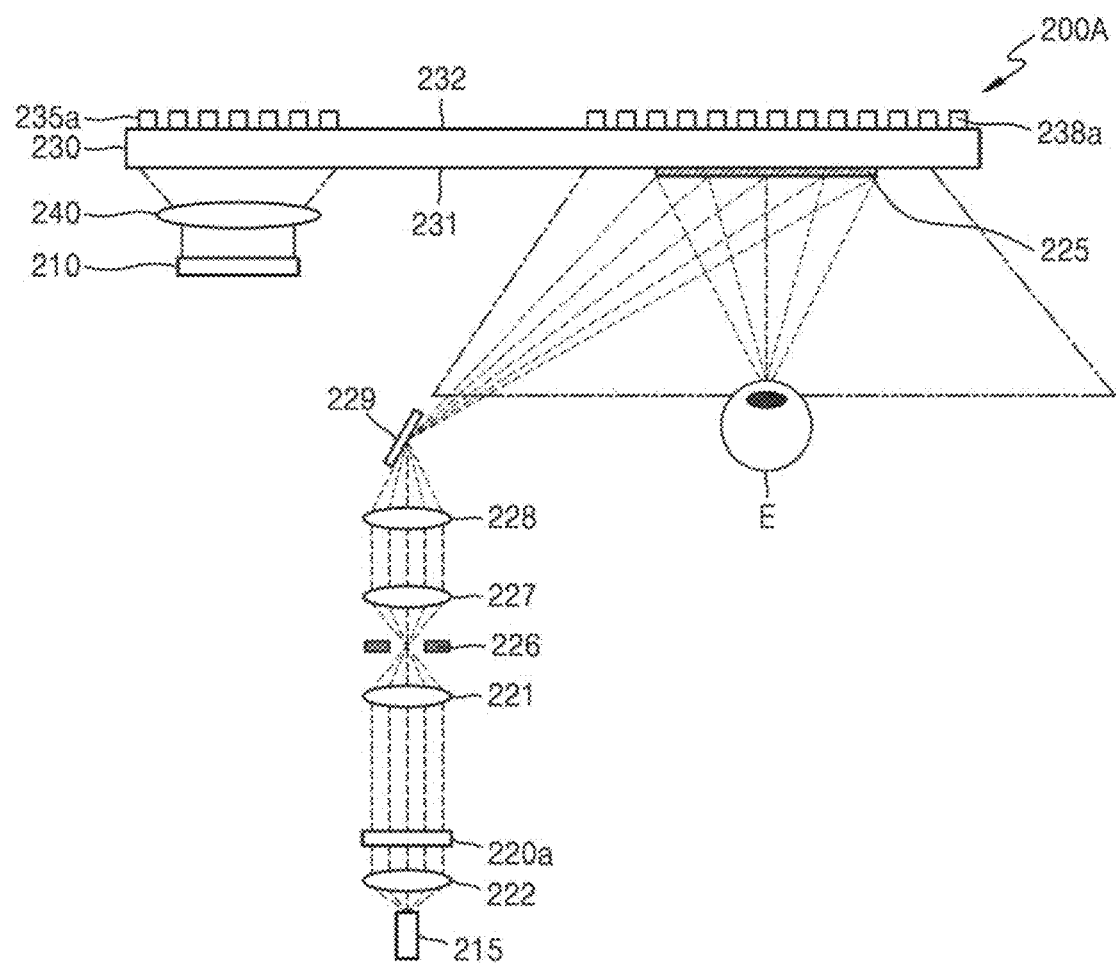
FIG. 5 illustrates an example of a change in a configuration of the foveated display apparatus shown in FIG. 4.

FIG. 5 illustrates a change in a position of the light source 215 in the foveated display apparatus 200 shown in FIG. 4. In FIG. 5, elements using the same reference numerals as in FIG. 4 have substantially the same configurations and functions, and thus detailed descriptions thereof are omitted.

In a foveated display apparatus 200A, an input coupler 235a may be provided on the second surface 232 of the light guide plate 230, and an output coupler 238a may be spaced apart from the input coupler 235a and provided on the second surface 232. In addition, the light source 215 radiates light to a second display panel 220a, and the light passes through the second display panel 220a so that a hologram image may be formed. The second display panel 220a may be, for example, a transmissive panel. The second display panel 220a may include an LCD. In an example embodiment, the light source 215 and the second display panel 220a may be arranged in a line. A fourth lens 222 may be further provided between the light source 215 and the beam splitter 224.

In the hologram image includes the spatial filter 226 so that a CGH may be reproduced well. The reproduced hologram image may propagate to enter a pupil of a user's eye with a narrow angle of view by the holographic optical element 225 coupled to the light guide plate 230. In an example embodiment, because the first display panel 210 and the second display panel 220 are independently spaced apart from each other, an optical system displaying a 2D image and an optical system displaying a hologram image may be separately designed.

Figure 6:
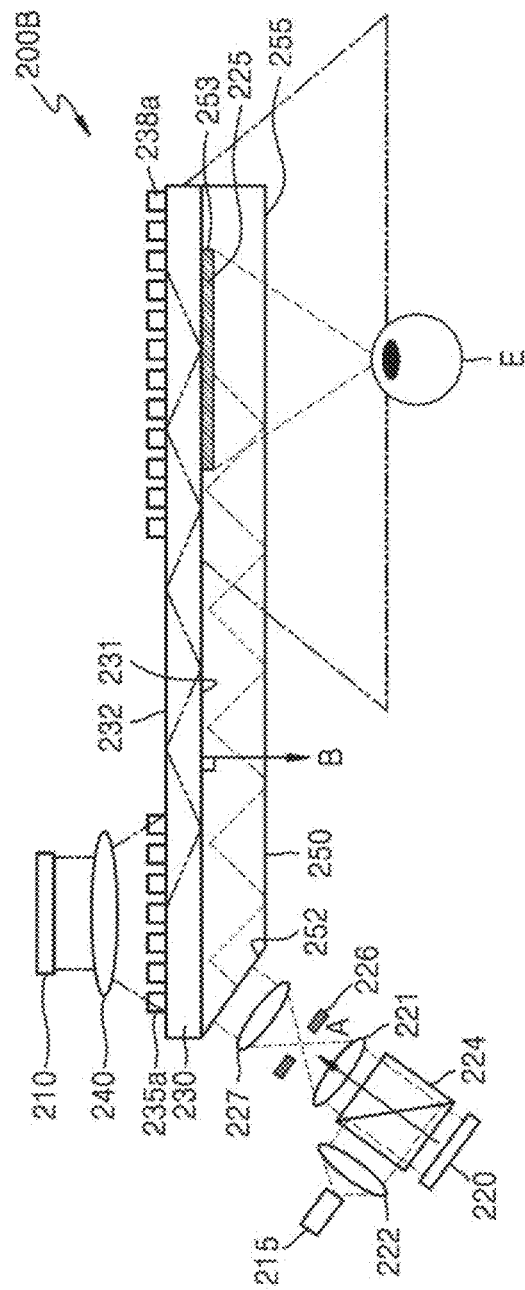
FIG. 6 illustrates an example of a change in a configuration of the foveated display apparatus shown in FIG. 4.

FIG. 6 illustrates a foveated display apparatus 200B according to an example embodiment. FIG. 6 illustrates a change in a configuration of the foveated display apparatus 200 illustrated in FIG. 4. In FIG. 6, elements using the same reference numerals as in FIG. 4 have substantially the same configurations and functions, and thus detailed descriptions thereof are omitted.

In the foveated display apparatus 200B, the first display panel 210 may be provided to face the second surface 232 of the light guide plate 230. The input coupler 235a and the output coupler 238a may be provided to be spaced apart from each other on the second surface 232 of the light guide plate 230. A sub light guide plate 250 may be provided on the first surface 231 of the light guide plate 230. The holographic optical element 225 may be provided between, for example, the light guide plate 230 and the sub light guide plate 250. The holographic optical element 225 may be provided in a recess 253 provided in the sub light guide plate 250. However, the recess 253 may be provided in the light guide plate 230. Alternatively, the holographic optical element 225 may be provided on an exit surface 255 of the sub light guide plate 250.

The second display panel 220 may be provided in a direction inclined with respect to the light guide plate 230. For example, the second display panel 220 may be positioned so that a direction A perpendicular to the second display panel 220 is not parallel to a direction B perpendicular to the second surface 232 of the light guide plate 230. The second display panel 220 may be disposed not to overlap with a position of the light guide plate 230 and may be disposed in a diagonal direction with respect to the light guide plate 230.

The sub light guide plate 250 may be combined in contact with, for example, the light guide plate 230. Further, the sub light guide plate 250 may include an inclined surface 252 on one side thereof. The inclined surface 252 may be provided to correspond to the second display panel 220. For example, the inclined surface 252 may be provided parallel to the second display panel 220, but is not limited thereto. The hologram image from the second display panel 220 may be incident on the inclined surface 252. In an example embodiment, because the hologram image propagates through the sub light guide plate 250, for example, when the foveated display apparatus 200B is applied to a glasses-type display, the image may be displayed regardless of a shape of a wearer's face. Although the inclined surface 252 is provided on one side of the sub light guide plate 250, the configuration of the inclined surface 252 is not limited thereto, and may be implemented as a separate prism having an inclined surface.

Figure 7:
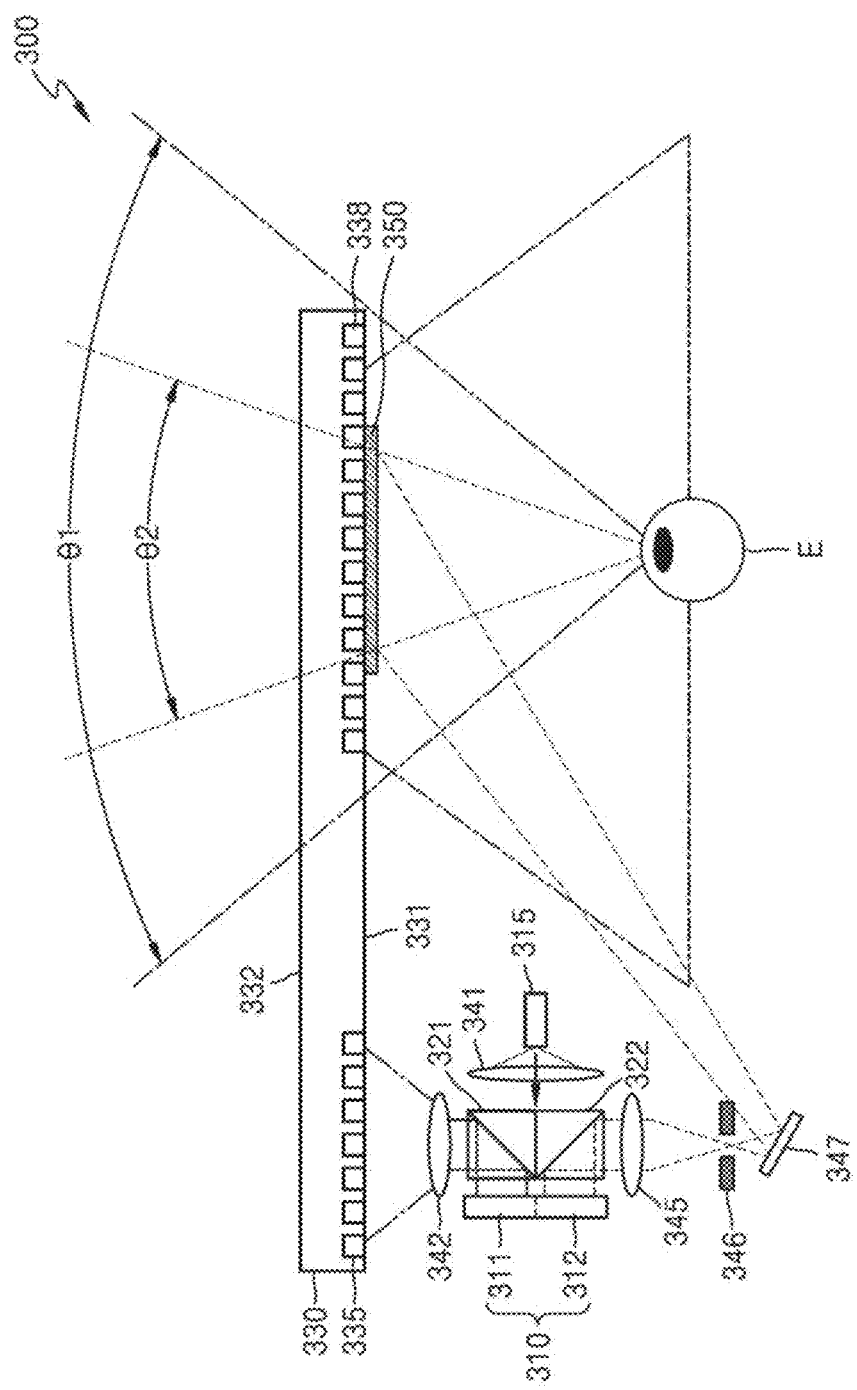
FIG. 7 is a diagram illustrating a foveated display apparatus according to an example embodiment.

FIG. 7 is a diagram illustrating a foveated display apparatus 300 according to an example embodiment.

The foveated display apparatus 300 may include a display panel 310 forming a 2D image and a hologram image including a 3D image, a light guide plate 330 transmitting the 2D image, and a holographic optical element 350 transmitting the hologram image.

The display panel 310 may include a first display panel 311 and a second display panel 312. The first display panel 311 may form the 2D image, and the second display panel 312 may form the hologram image. In an example embodiment, the first display panel 311 and the second display panel 312 may be integrally provided. Although the first display panel 311 and the second display panel 312 are integrally provided, the first display panel 311 and the second display panel 312 may independently process an image. The first display panel 311 and the second display panel 312 are arranged in parallel. Although FIG. 7 illustrates an example in which the first display panel 311 and the second display panel 312 are integrally formed, the first display panel 311 and the second display panel 312 may be independently provided and may be in parallel arranged in contact with or adjacent to each other.

A light source 315 that radiates light to the display panel 310 may be provided. A first beam splitter 321 and a second beam splitter 322 may be provided to face the first display panel 311 and the second display panel 312, respectively. The first beam splitter 321 may be provided between the first display panel 311 and the light source 315, and the second beam splitter 322 may be provided between the second display panel 312 and the light source 315. The first beam splitter 321 and the second beam splitter 322 may be arranged in parallel. In addition, the first beam splitter 321 and the second beam splitter 322 may be combined in contact with each other or disposed adjacent to each other.

The first beam splitter 321 and the second beam splitter 322 may reflect a partial light and pass the remaining light therethrough. Accordingly, light emitted from the light source 315 may pass through the first beam splitter 321 and the second beam splitter 322 to be respectively incident on the first display panel 311 and the second display panel 312. Using the incident light, the 2D image may be formed on the first display panel 311 and the hologram image may be formed on the second display panel 312.

The first display panel 311 and the second display panel 312 may be reflective. Accordingly, the 2D image formed by the first display panel 311 may be reflected by the first beam splitter 321, and the hologram image formed by the second display panel 312 may be reflected by the second beam splitter 322. The 2D image may be reflected by the first beam splitter 321 and incident on the light guide plate 330. A 3D image may be reflected by the second beam splitter 322 to travel in a direction opposite to a direction in which the 2D image is reflected as shown in FIG. 7.

The light guide plate 330 may include a first surface 331 through which light is output toward the user's eye E, and a second surface 332 facing the first surface 331. An input coupler 335 may be provided on one side of the first surface 331, and an output coupler 338 may be provided on a different part of the first surface 331 to be spaced apart from the input coupler 335. The input coupler 335 and the output coupler 338 may be provided on the second surface 332. In an example embodiment, the input coupler 335 and the output coupler 338 may be provided on the light guide plate 330 in an engraved structure.

A first lens 341 may be further provided between the light source 330 and the first beam splitter 321 and the second beam splitter 322. For example, the first lens 341 may collimate the light emitted from the light source 315.

A second lens 342 may be provided between the first beam splitter 321 and the input coupler 335. The second lens 342 may, for example, magnify the 2D image output from the first beam splitter 321 to be incident on the input coupler 335. The 2D image incident on the input coupler 335 may be transmitted to the output coupler 338 through the light guide plate 330 and displayed on a peripheral area of the user's eye E with a wide angle of view.

A light path converter 347 converting a light path so that the hologram image output from the second beam splitter 322 is directed to the holographic optical element 350 may be further provided. The light path converter 347 may include, for example, a mirror. In FIG. 7, one light path converter 347 is provided, but a plurality of light path converters may be provided.

A filter 346 may be further provided on the light path between the second beam splitter 322 and the holographic optical element 350. The filter 346 may include, for example, a Fourier transformation filter. In addition, a third lens 345 may be further provided on the optical path between the second light path beam splitter 322 and the holographic optical element 350. The third lens 345 may focus light so that the light emitted from the second beam splitter 322 may pass through the filter 346. As described above, the hologram image output from the second beam splitter 322 may be incident on the holographic optical element 350 through the filter 346 and the light path converter 347. The holographic optical element 350 may narrow an angle of view of the hologram image to enter a fovea area of the user's eye E. Accordingly, the hologram image may have a high resolution and be provided in the fovea area of the user's eye E.

In an example embodiment, the first display panel 311 and the second display panel 312 may be arranged in parallel, and an optical system for the 2D image and an optical system for the hologram image may be compactly arranged.

The foveated display apparatus 300 according to an example embodiment may provide a low resolution 2D image having a wide angle of view and a high resolution hologram image having a narrow angle of view sequentially or simultaneously, and a user may view a natural stereoscopic image obtained by combining the 2D image and the hologram image.

A foveated rendering technology may be applied to the foveated display apparatus. Foveated rendering is a virtual reality (VR) or AR technology that follows the movement of a user's pupil and shows an image like a real field of view. When a person is looking at a certain direction or object, a part entering the center of the field of view may be seen at a high resolution and a peripheral part may be seen at a low resolution, thereby reducing the amount of image processing calculation and increasing the image processing speed.

The foveated display apparatuses according to various example embodiments described above may be applied to various devices such as augmented reality glasses, virtual reality (VR) glasses, or head-up displays (HUD). In addition, the foveated display apparatuses according to various example embodiments may be applied to various fields such as entertainment, education, and medicine.

Figure 8:
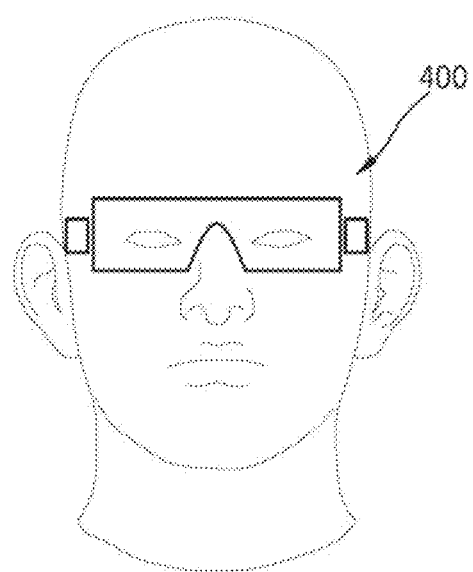
FIG. 8 illustrates an example of a foveated display apparatus applied to an augmented reality (AR) glasses apparatus according to various example embodiments.

FIG. 8 illustrates an example of a foveated display apparatus applied to AR glasses 400 according to an example embodiment. In the disclosure, AR may mean overlaying and displaying a virtual image on an image of a physical environment space in the real world or a real world object together. In the disclosure, an AR device is a device capable of expressing AR, and may include not only AR glasses in the shape of glasses that a user wears on a face part, but also a head mounted display (HMD) and an AR helmet that the user wears on a head part.

In the disclosure, a real scene is a scene of the real world viewed by an observer or a user through an AR device, and may include a real world object(s). A virtual image may represent an image generated through an optical system. The virtual image may include both static and dynamic images. Such a virtual image is observed together with the real scene, and may be an image showing information about the real world object in the real scene, information about an operation of the AR device, or a control menu. A virtual object may be expressed as a partial area of the virtual image. The virtual object may represent information related to the real world object. The virtual object may include, for example, at least one of letters, numbers, symbols, icons, images, and animations.

Figure 9:
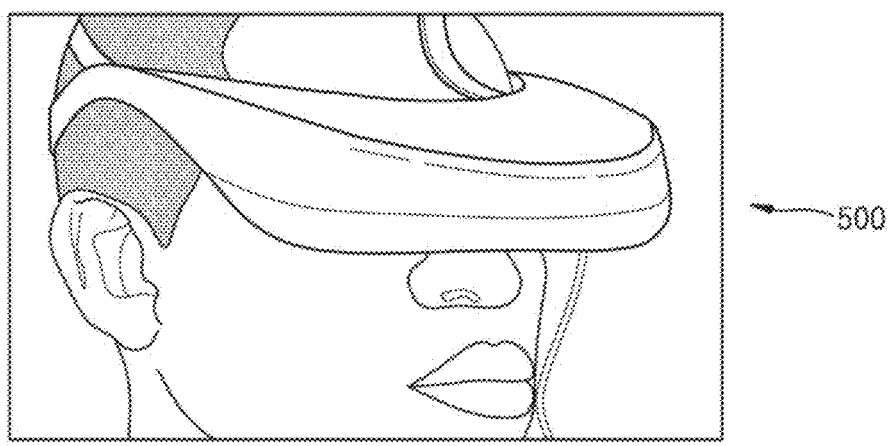
FIG. 9 illustrates an example of a foveated display apparatus applied to a virtual reality (VR) glasses apparatus according to various example embodiments.
Figure 10:
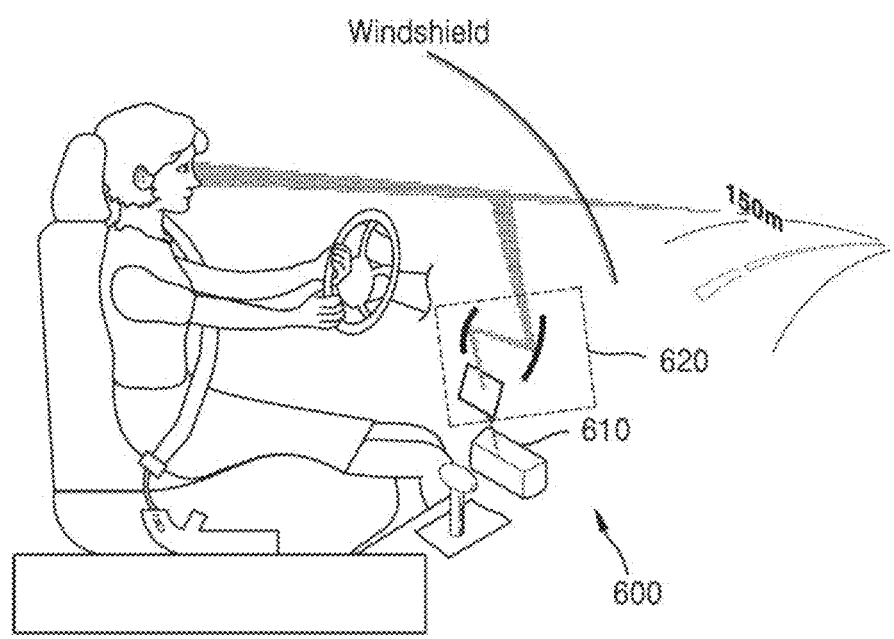
FIG. 10 illustrates an example of a foveated display apparatus applied to a head up display for a vehicle according to various example embodiments.

FIG. 9 illustrates an example of a foveated display apparatus applied to a VR glasses 500 according to an example embodiment. FIG. 10 illustrates an example of a foveated display apparatus 610 applied to a vehicle according to an example embodiment. The foveated display apparatus may be applied to a head-up display apparatus 600 for the vehicle. The head-up display apparatus 600 may include the foveated display apparatus 610 provided in an area of the vehicle, and at least one light path conversion member 620 converting a path of light so that a driver may view an image generated by the foveated display apparatus 610.

Figure 11:
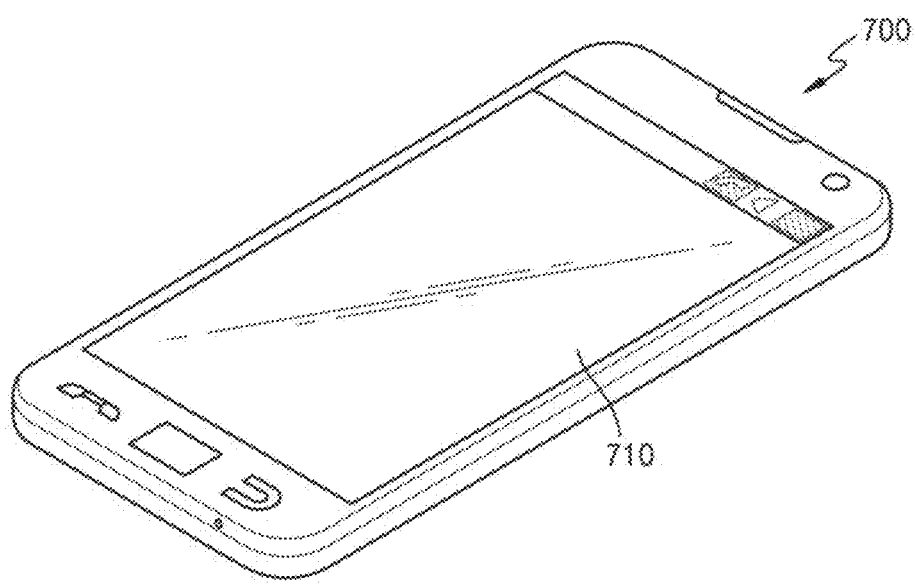
FIG. 11 illustrates an example of a foveated display apparatus applied to a mobile device according to various example embodiments.

FIG. 11 illustrates an example of a foveated display apparatus 710 applied to a mobile device 700 according to an example embodiment. The display apparatus described with reference to FIGS. 1 to 8 may be applied to the foveated display apparatus 710.

Figure 12:
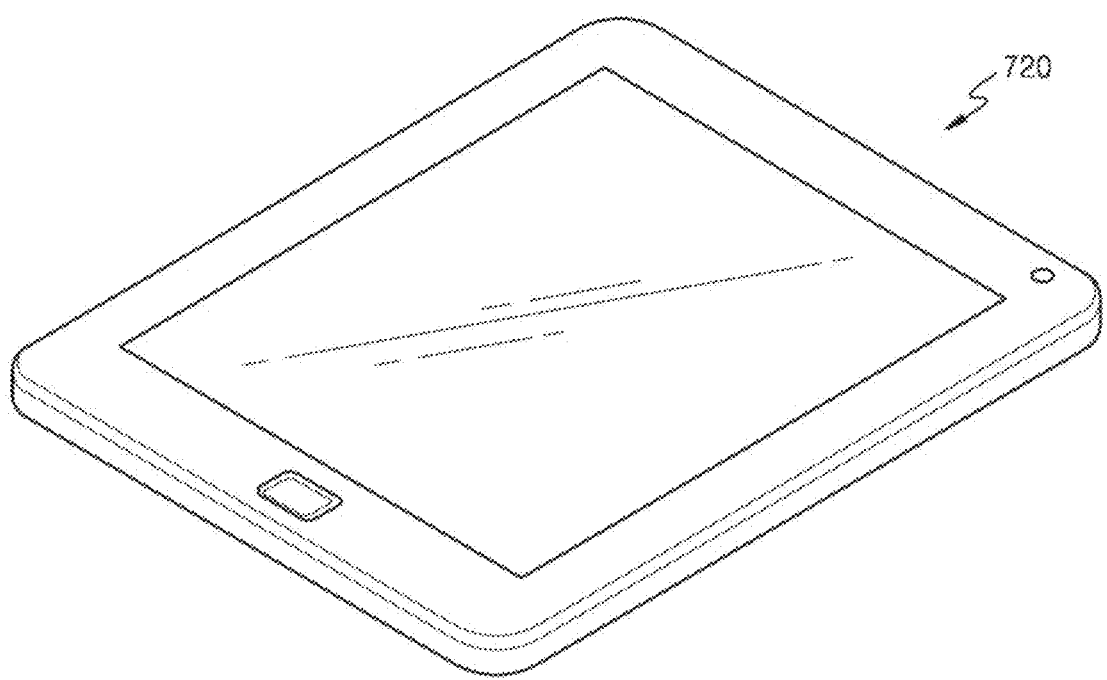
FIG. 12 illustrates an example of a foveated display apparatus applied to a tablet according to various example embodiments.
Figure 13:
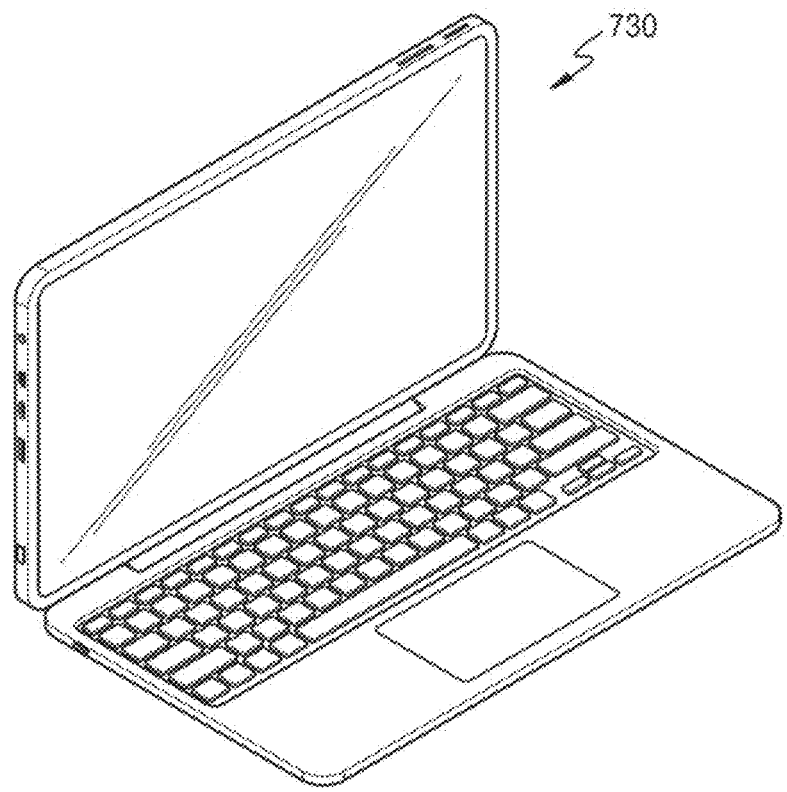
FIG. 13 illustrates an example of a foveated display apparatus applied to a notebook computer according to various example embodiments.
Figure 14:
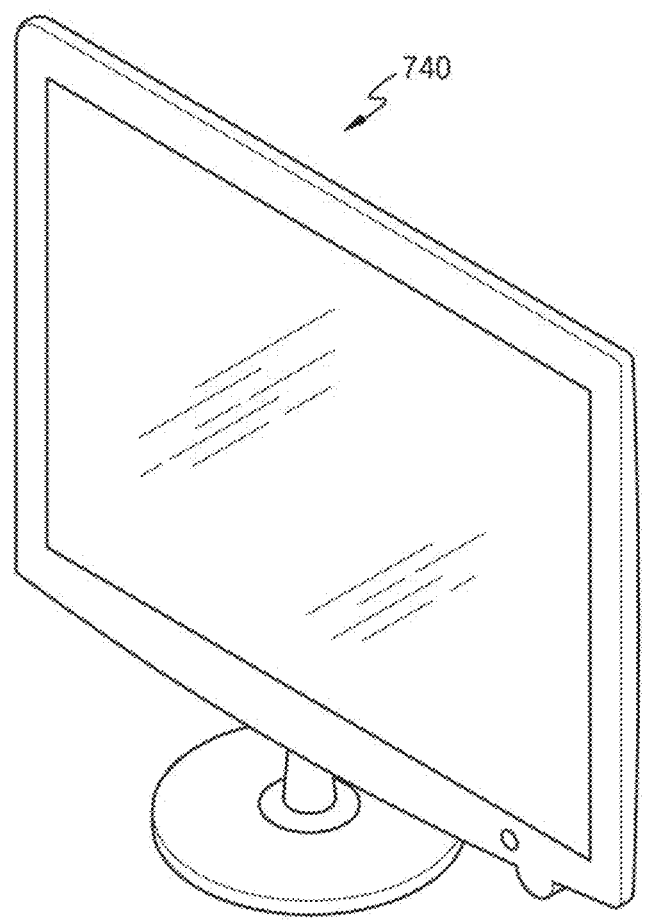
FIG. 14 illustrates an example of a foveated display apparatus applied to a computer monitor according to various example embodiments.
Figure 15:
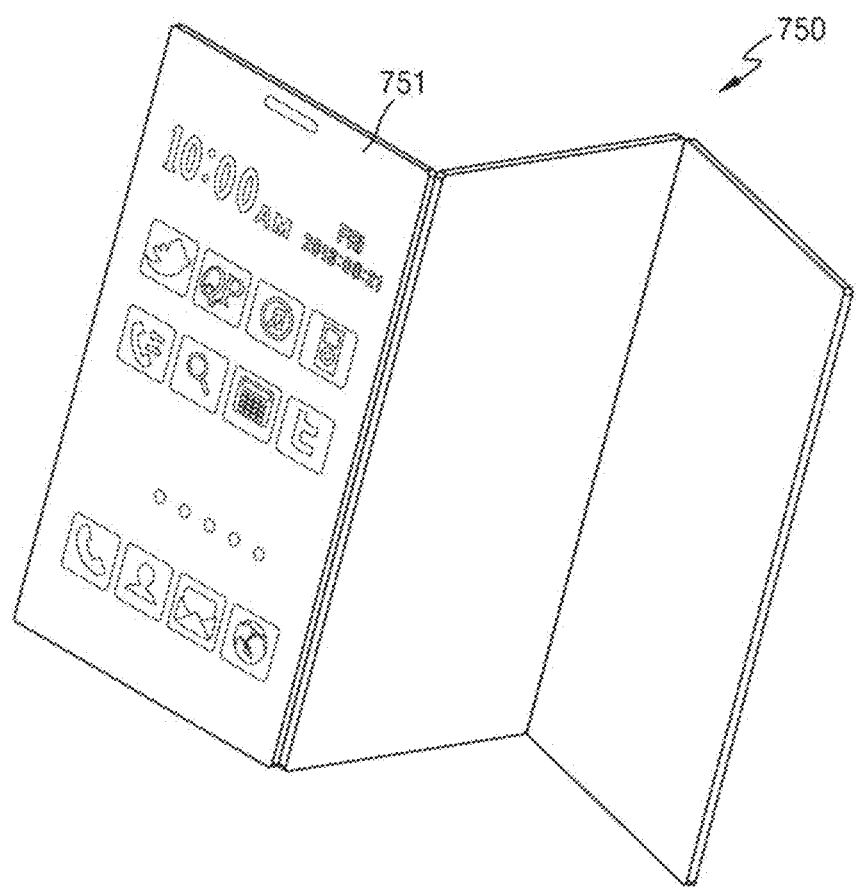
FIG. 15 illustrates an example of a foveated display apparatus applied to a multi folder display according to various example embodiments.
Figure 16:
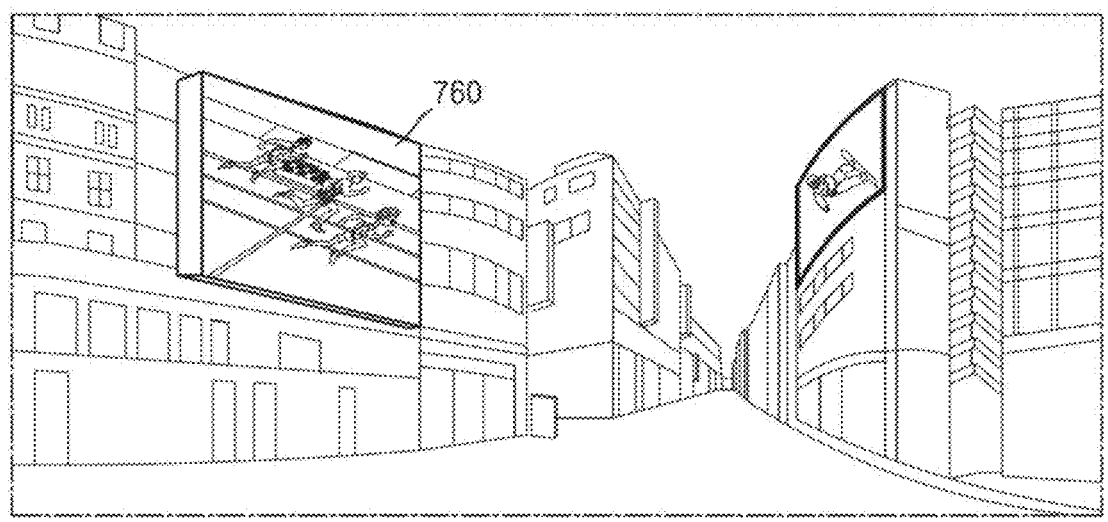
FIG. 16 illustrates an example of a foveated display apparatus applied to a signage according to various example embodiments.
Figure 17:
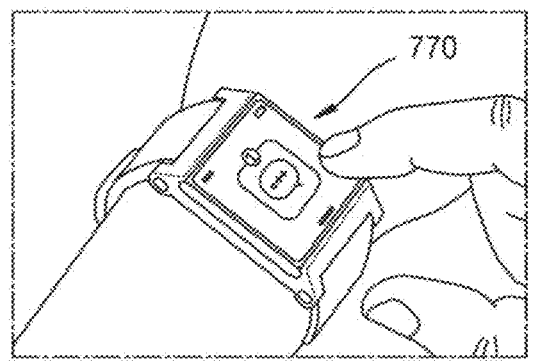
FIG. 17 illustrates an example of a foveated display apparatus applied to a smart watch according to various example embodiments.

The foveated display apparatus according to various example embodiments may be applied to a tablet or a smart tablet 720 as shown in FIG. 12. In addition, the foveated display apparatus according to various example embodiments may be applied to a notebook computer 730 as illustrated in FIG. 13, and may also be applied to a computer monitor 740 or a TV as illustrated in FIG. 14. In addition, as illustrated in FIG. 15, a foveated display apparatus 751 according to various example embodiments may be applied to a multi folder display 750. As illustrated in FIG. 16, the foveated display apparatus according to various example embodiments may be applied to a large display used in a signage 760, a large billboard, a theater screen, and the like. In addition, as illustrated in FIG. 17, a foveated display apparatus according to various example embodiments may be applied to a smart watch 770.

Figure 18:
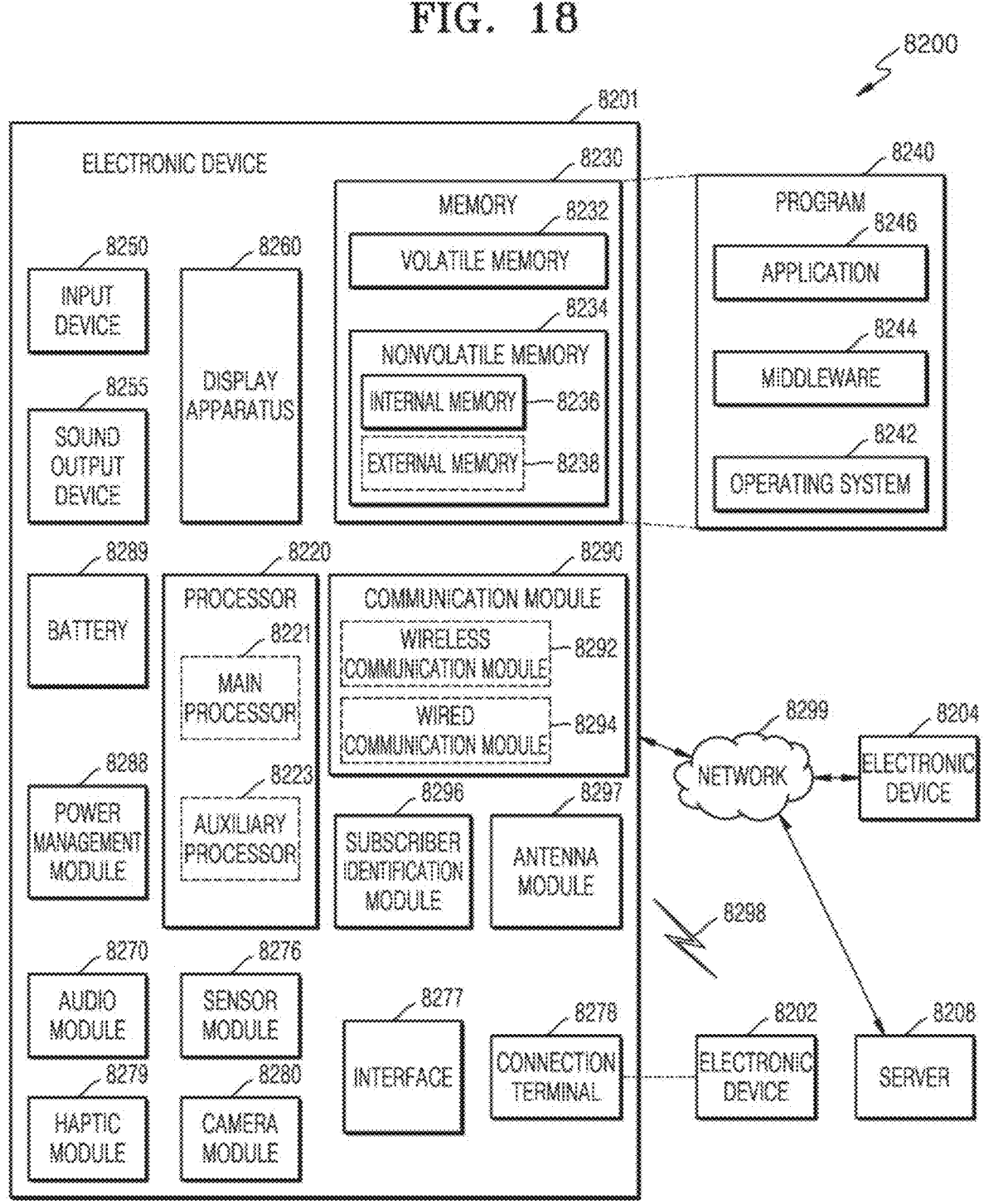
FIG. 18 is a block diagram of an electronic device including a foveated display apparatus according to various example embodiments.

FIG. 18 is a block diagram of an electronic device 8201 including a foveated display apparatus according to an example embodiment.

Referring to FIG. 18, the electronic device 8201 may be provided in a network environment 8200. In the network environment 8200, the electronic device 8201 may communicate with another electronic device 8202 through a first network 8298 (a short-range wireless communication network, etc.), or may communicate with another electronic device 8204 and/or a server 8208 through a second network 8299 (a remote-range wireless communication network, etc.) The electronic device 8201 may communicate with the electronic device 8204 through the server 8208. The electronic device 8201 may include a processor 8220, a memory 8230, an input device 8250, a sound output device 8255, a display apparatus 8260, an audio module 8270, a sensor module 8276, an interface 8277, a haptic module 8279, a camera module 8280, a power management module 8288, a battery 8288, a communication module 8290, a subscriber identification module 8296, and/or an antenna module 8297. Some of these elements may be omitted or other elements may be added to the electronic device 8201. Some of these elements may be implemented as one integrated circuit. For example, the sensor module 8276 (a fingerprint sensor, an iris sensor, an illumination sensor, etc.) may be embedded in the display apparatus 8260 (a display, etc.)

The processor 8220 may execute software (a program 8240, etc.) to control one element or a plurality of other elements (hardware or software elements, etc.) of the electronic device 8201 connected to the processor 8220, and perform various data processing or operations. As part of data processing or operations, the processor 8220 may load commands and/or data received from another element (the sensor module 8276, the communication module 8290, etc.) into a volatile memory 8232, process the commands and/or data stored in the volatile memory 8232 and store resultant data in a nonvolatile memory 8234. The processor 8220 may include a main processor 8221 (a central processing unit, an application processor, etc.) and an auxiliary processor 8223 (a graphic processing unit, an image signal processor, a sensor hub processor, a communication processor, etc.) operable independently or together therewith. The auxiliary processor 8223 may use less power than a main processor 8221 and may perform specialized functions.

On behalf of the main processor 8221 while the main processor 8221 is in an inactive state (a sleep state), or together with the main processor 8221 while the main processor 8221 is in an active state (an application execution state), the auxiliary processor 8223 may control functions and/or states related to some of the elements (the display apparatus 8260, the sensor module 8276, the communication module 8290, etc.) of the electronic device 8201. The auxiliary processor 8223 (an image signal processor, a communication processor, etc.) may be implemented as part of other functionally related elements (the camera module 8280, the communication module 8290, etc.)

The memory 8230 may store various data required by the elements (the processor 8220, the sensor module 8276, etc.) of the electronic device 8201. The data may include, for example, software (the program 8240, etc.) and input data and/or output data for commands related thereto. The memory 8230 may include the volatile memory 8232 and/or the nonvolatile memory 8234.

The program 8240 may be stored as software in the memory 8230 and may include an operating system 8242, middleware 8244, and/or an application 8246.

The input device 8250 may receive commands and/or data to be used for the elements (the processor 8220, etc.) of the electronic device 8201 from the outside (a user, etc.) of the electronic device 8201. The input device 8250 may include a remote controller, a microphone, a mouse, a keyboard, and/or a digital pen (such as a stylus pen).

The sound output device 8255 may output a sound signal to the outside of the electronic device 8201. The sound output device 8255 may include a speaker and/or a receiver. The speaker may be used for general purposes such as multimedia playback or recording playback, and the receiver may be used to receive incoming calls. The receiver may be combined as a part of the speaker or may be implemented as an independent separate device.

The display apparatus 8260 may visually provide information to the outside of the electronic device 8201. The display apparatus 8260 may include a display, a hologram device, or a projector and a control circuit for controlling the device. The display apparatus 8260 may include any of the foveated display apparatuses described with reference to FIGS. 1 to 8. The display apparatus 8260 may include a touch circuitry set to sense a touch, and/or a sensor circuit (such as a pressure sensor) set to measure the strength of a force generated by the touch.

The audio module 8270 may convert sound into an electric signal, or vice versa. The audio module 8270 may obtain sound through the input device 8250, or may output sound through the sound output device 8255, and/or a speaker and/or a headphone of another electronic device (the electronic device 8202, 8204, etc.) directly or wirelessly connected to the electronic device 8201.

The sensor module 8276 may sense an operating state (power, temperature, etc.) of the electronic device 8201 or an external environmental state (a user state, etc.), and generate an electrical signal and/or a data value corresponding to the sensed state. The sensor module 8276 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 8277 may support one or more designated protocols that may be used for the electronic device 8201 to be directly or wirelessly connected to another electronic device (the electronic device 8202, 8204, etc.) The interface 8277 may include a High Definition Multimedia Interface (HDMI), a Universal Serial Bus (USB) interface, an SD card interface, and/or an audio interface.

A connection terminal 8278 may include a connector through which the electronic device 8201 may be physically connected to another electronic device (the electronic device 8202, etc.) The connection terminal 8278 may include an HDMI connector, a USB connector, an SD card connector, and/or an audio connector (such as a headphone connector).

The haptic module 8278 may convert an electrical signal into a mechanical stimulus (vibration, movement, etc.) or an electrical stimulus that a user may perceive through a tactile or motor sense. The haptic module 8278 may include a motor, a piezoelectric element, and/or an electrical stimulation device.

The camera module 8280 may capture a still image and a video. The camera module 8280 may include a lens assembly including one or more lenses, image sensors, image signal processors, and/or flashes. The lens assembly included in the camera module 8280 may collect light emitted from a subject that is a target of image capture.

The power management module 8288 may manage power supplied to the electronic device 8201. The power management module 8288 may be implemented as a part of a power management integrated circuit (PMIC).

The battery 8289 may supply power to the elements of the electronic device 8201. The battery 8289 may include a non-rechargeable primary cell, a rechargeable secondary cell, and/or a fuel cell.

The communication module 8290 may establish a direct (wired) communication channel and/or a wireless communication channel between the electronic device 8201 and other electronic devices (the electronic device 8202, the electronic device 8204, the server 8208, etc.), and support communication through the established communication channel. The communication module 8290 may include one or more communication processors operating independently of the processor 8220 (an application processor, etc.) and supporting direct communication and/or wireless communication. The communication module 8290 may include a wireless communication module 8292 (a cellular communication module, a short-range wireless communication module, a Global Navigation Satellite System (GNSS) communication module, etc.) and/or a wired communication module 8294 (a Local Area Network (LAN) communication module, a power line communication module, etc.) Among these communication modules, the corresponding communication module may communicate with other electronic devices through a first network 8298 (a short-range communication network such as Bluetooth, WiFi Direct, or Infrared Data Association (IrDA)) or through a second network 8299 (a remote range communication network such as a cellular network, the Internet, or a computer network (LAN), WAN, etc.) These various types of communication modules may be integrated into one element (a single chip, etc.), or may be implemented as a plurality of elements (multiple chips) separate from each other. The wireless communication module 8292 may use subscriber information (International Mobile Subscriber Identifier (IMSI), etc.) stored in the subscriber identification module 8296 to confirm and authenticate the electronic device 8201 in a communication network such as the first network 8298 and/or the second network 8299.

The antenna module 8297 may transmit signals and/or power to the outside (such as other electronic devices) or receive signals and/or power from the outside. The antenna module 8297 may include a radiator formed in a conductive pattern on a substrate (a PCB, etc.). The antenna module 8297 may include one or a plurality of antennas. When the antenna module 8297 include the plurality of antennas, an antenna suitable for a communication method used in a communication network such as the first network 8298 and/or the second network 8299 may be selected from among the plurality of antennas by the communication module 8290. Signals and/or power may be transmitted or received between the communication module 8290 and other electronic devices through the selected antenna. In addition to the antenna, other elements (such as an RFIC) may be included as a part of the antenna module 8297.

Some of the elements may be connected to each other through a communication method (a bus, General Purpose Input and Output (GPIO), Serial Peripheral Interface (SPI), Mobile Industry Processor Interface (MIPI), etc.) between peripheral devices and may exchange signals (commands, data, etc.)

The commands or data may be transmitted or received between the electronic device 8201 and the external electronic device 8204 through the server 8208 connected to the second network 8299. The other electronic devices 8202 and 8204 may be the same type or different types of devices as the electronic device 8201. All or some of operations executed by the electronic device 8201 may be executed by one or more devices of the other electronic devices 8202, 8204, and 8208. For example, when the electronic device 8201 needs to perform a function or service, instead of executing the function or service by itself, the electronic device 8201 may request one or more other electronic devices to partly or wholly perform the function or service. One or more other electronic devices that have received a request may execute an additional function or service related to the request, and transmit a result of the execution to the electronic device 8201. To this end, cloud computing, distributed computing, and/or client-server computing technology may be used.

The above-described embodiments are merely examples, and various modifications and equivalent other embodiments are possible from those of ordinary skill in the art. Therefore, the true technical protection scope according to embodiments should be determined by the technical idea of the disclosure described in the following claims.

The foveated display apparatuses according to one or more example embodiments may provide a high resolution image having a narrow angle of view and a low resolution image having a wide angle of view using a display panel providing a 2D image and a display panel providing a 3D hologram image.

The foveated display apparatuses according to one or more example embodiments provide a high resolution image only in a fovea area, and thus reducing the amount of calculation for image processing, thereby increasing an image display speed and efficiently providing a 3D image.

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A foveated display apparatus comprising:
   a first display panel configured to form a two-dimensional (2D) image;
   a second display panel configured to form a hologram image comprising a three-dimensional (3D) image;
   a light guide plate configured to transmit the 2D image at a first angle of view to an eye of a user; and
   a holographic optical element configured to transmit the hologram image at a second angle of view to the eye of the user, the second angle of view being smaller than the first angle of view,
   wherein the light guide plate comprises a single body of planar plate structure,
   wherein the first display panel and the second display panel are integrally configured, and
   wherein the foveated display apparatus further comprises:
      a light source configured to radiate light to the first display panel and the second display panel;
      a first beam splitter provided between the first display panel and the light source; and
      a second beam splitter provided between the second display panel and the light source.

2. The foveated display apparatus of claim 1, wherein the 2D image comprises a peripheral image having first resolution, and
   wherein the hologram image comprises a fovea image having a second resolution that is higher than the first resolution.

3. The foveated display apparatus of claim 1, wherein the 2D image comprises a single depth image, and the hologram image comprises a multi depth image.

4. The foveated display apparatus of claim 1, wherein the second angle of view is about 20 degrees or less.

5. The foveated display apparatus of claim 1, wherein the light guide plate comprises a first surface from which light is emitted and a second surface opposite to the first surface; and
   wherein the foveated display apparatus further comprises an input coupler provided on one of the first surface or the second surface.

6. The foveated display apparatus of claim 1, wherein the light guide plate comprises a first surface from which light is emitted and a second surface opposite to the first surface, and
   wherein the foveated display apparatus further comprises an output coupler provided on one of the first surface or the second surface.

7. The foveated display apparatus of claim 1, wherein the light guide plate comprises a first surface through which light is emitted and a second surface facing the first surface, and
   wherein the holographic optical element is provided on the first surface or the second surface.

8. The foveated display apparatus of claim 1, wherein the second display panel comprises a light-emitting diode (LED) display, an organic LED (OLED) display, a liquid crystal display (LCD) display, or a liquid crystal on silicon (LCoS) display.

9. The foveated display apparatus of claim 1, further comprising:
   a light source configured to radiate light to the second display panel;
   a beam splitter configured to reflect the light radiated from the light source to be incident on the second display panel and transmit the light reflected from the second display panel; and
   a filter configured to filter the light passing through the beam splitter.

10. The foveated display apparatus of claim 9, further comprising:

a light path converter configured to direct the light that has passed through the filter to the holographic optical element.

11. The foveated display apparatus of claim 1, further comprising:
 a light source configured to radiate light to the second display panel; and
 a filter configured to filter the light emitted from the light source that has passed through the second display panel.

12. The foveated display apparatus of claim 1, wherein the light guide plate comprises a first surface and a second surface facing the first surface,
 wherein the foveated display apparatus further comprises a sub light guide plate provided on the first surface,
 wherein the first display panel faces the second surface, and
 wherein the hologram image formed on the second display panel is transmitted through the sub light guide plate.

13. The foveated display apparatus of claim 12, wherein the sub light guide plate comprises an inclined incidence surface on one side thereof, and
 wherein the hologram image formed on the second display panel is incident on the inclined incidence surface.

14. The foveated display apparatus of claim 12, wherein the holographic optical element is provided between the light guide plate and the sub light guide plate or is provided on an exit surface of the sub light guide plate.

15. The foveated display apparatus of claim 1, wherein a 2D image reflected from the first beam splitter is incident on the light guide plate, and
 wherein the hologram image reflected from the second beam splitter is incident on the holographic optical element.

16. The foveated display apparatus of claim 1, wherein the 2D image is transmitted through the light guide plate, and
 wherein the hologram image is transmitted to the holographic optical element without passing through the light guide plate.

17. The foveated display apparatus of claim 1, wherein the 2D image and the hologram image are sequentially or simultaneously displayed and combined to display a single image.

18. The foveated display apparatus of claim 1, further comprising:
 at least one of a micro electro-mechanical system (MEMS) mirror, a galvano mirror, a liquid crystal lens, a liquid crystal beam deflector, a geometric phase lens, and a meta lens for controlling an area on which the hologram image is displayed.

19. The foveated display apparatus of claim 1, further comprising:
 a pupil tracker configured to track a user's pupil.

* * * * *